(12) United States Patent
Shroff et al.

(10) Patent No.: US 11,680,903 B2
(45) Date of Patent: Jun. 20, 2023

(54) SYSTEMS AND METHODS FOR THREE-DIMENSIONAL FLUORESCENCE POLARIZATION VIA MULTIVIEW IMAGING

(71) Applicant: The United States of America, as represented by the Secretary, Department of Health and Human Services, Bethesda, MD (US)

(72) Inventors: Hari Shroff, Bethesda, MD (US); Abhishek Kumar, Bethesda, MD (US); Shalin B. Mehta, Bethesda, MD (US); Patrick Jean La Riviere, Bethesda, MD (US); Rudolf Oldenbourg, Bethesda, MD (US); Yicong Wu, Bethesda, MD (US); Talon Chandler, Bethesda, MD (US)

(73) Assignees: THE UNITED STATES OF AMERICA, AS REPRESENTED BY THE SECRETARY, DEPARTMENT OF HEALTH AND HUMAN SERVICES, Bethesda, MD (US); THE UNIVERSITY OF CHICAGO, Chicago, IL (US); THE MARINE BIOLOGICAL LABORATORY, Woods Hole, MA (US)

( * ) Notice: Subject to any disclaimer, the term of this patent is extended or adjusted under 35 U.S.C. 154(b) by 0 days.

(21) Appl. No.: 17/814,096

(22) Filed: Jul. 21, 2022

(65) Prior Publication Data
US 2022/0357277 A1    Nov. 10, 2022

Related U.S. Application Data

(63) Continuation of application No. 16/616,891, filed as application No. PCT/US2018/035303 on May 31, 2018, now Pat. No. 11,428,632.
(Continued)

(51) Int. Cl.
  *G02B 21/02* (2006.01)
  *G01N 21/64* (2006.01)
  (Continued)

(52) U.S. Cl.
  CPC ..... *G01N 21/6445* (2013.01); *G01N 21/6458* (2013.01); *G02B 21/02* (2013.01);
  (Continued)

(58) Field of Classification Search
  CPC .......... G01N 21/6445; G01N 21/6458; G02B 21/02; G02B 21/088; G02B 21/16; G02B 21/367; G02B 27/283; G02B 27/286
  See application file for complete search history.

(56) References Cited

U.S. PATENT DOCUMENTS 5,943,129 A    8/1999  Hoyt et al.
5,969,854 A   10/1999  Stelzer et al.
(Continued)

FOREIGN PATENT DOCUMENTS

JP   H11513145 A   11/1999
JP   2006208294 A   8/2006
(Continued)

OTHER PUBLICATIONS

International Bureau of WIPO, International Preliminary Report on Patentability Issued in Application No. PCT/US2018/035303, dated Dec. 3, 2018, WIPO, 14 pages.
(Continued)

*Primary Examiner* — David P Porta
*Assistant Examiner* — Fani Polyzos Boosalis
(74) *Attorney, Agent, or Firm* — McCoy Russell LLP

(57) ABSTRACT

Systems and methods for three-dimensional fluorescence polarization excitation that generates maps of positions and orientation of fluorescent molecules in three or more dimensions are disclosed.

20 Claims, 5 Drawing Sheets

Related U.S. Application Data

(60) Provisional application No. 62/513,519, filed on Jun. 1, 2017.

(51) Int. Cl.
*G02B 21/08* (2006.01)
*G02B 21/16* (2006.01)
*G02B 21/36* (2006.01)
*G02B 27/28* (2006.01)

(52) U.S. Cl.
CPC ........... *G02B 21/088* (2013.01); *G02B 21/16* (2013.01); *G02B 21/367* (2013.01); *G02B 27/283* (2013.01); *G02B 27/286* (2013.01)

(56) References Cited

U.S. PATENT DOCUMENTS

| 6,970,241 | B1 | 11/2005 | DeSa |
| 7,848,000 | B2 | 12/2010 | Wang |
| 2003/0142292 | A1* | 7/2003 | Wolleschensky .. G02B 21/0076 356/417 |
| 2005/0006597 | A1* | 1/2005 | Wolleschensky .... G02B 21/002 356/342 |
| 2008/0158551 | A1 | 7/2008 | Hess |
| 2014/0126046 | A1 | 5/2014 | Shroff et al. |
| 2017/0045521 | A1 | 2/2017 | Vinegoni et al. |

FOREIGN PATENT DOCUMENTS

| WO | 2016049368 A1 | 3/2016 |
| WO | 2017035078 A1 | 3/2017 |

OTHER PUBLICATIONS

Japanese Patent Office, Office Action Issued in Application No. 2019-566626, dated Mar. 15, 2022, 6 pages.

China National Intellectual Property Administration, Office Action and Search Report Issued in Application No. 201880035990.9, dated May 27, 2021, 32 pages.

* cited by examiner

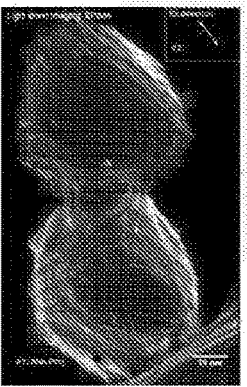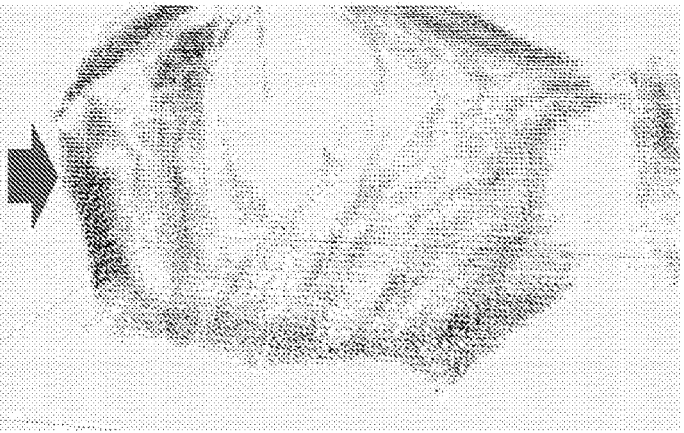
FIG. 5A
FIG. 5B

SYSTEMS AND METHODS FOR THREE-DIMENSIONAL FLUORESCENCE POLARIZATION VIA MULTIVIEW IMAGING

CROSS REFERENCE TO RELATED APPLICATIONS

The present application is a Continuation of U.S. National Stage patent application Ser. No. 16/616,891, entitled "SYSTEMS AND METHODS FOR THREE DIMENSIONAL FLUORESCENCE POLARIZATION VIA MULTIVIEW IMAGING", and filed on Nov. 25, 2019. application Ser. No. 16/616,891 claims priority to International Patent Application No. PCT/US2018/035303, entitled "SYSTEMS AND METHODS FOR THREE DIMENSIONAL FLUORESCENCE POLARIZATION VIA MULTIVIEW IMAGING", and filed on May 31, 2018. Application No. PCT/US2018/035303 claims priority to U.S. Provisional Application No. 62/513,519, entitled "SYSTEMS AND METHODS FOR THREE DIMENSIONAL FLUORESCENCE POLARIZATION VIA MULTIVIEW IMAGING", and filed on Jun. 1, 2017. The entire contents of the above-listed applications are hereby incorporated by reference for all purposes.

FIELD

The present disclosure relates to systems and methods for three-dimensional fluorescence polarization excitation, and in particular to a fluorescence microscope that generates maps of position and orientation of fluorescent molecules in three or more dimensions.

BACKGROUND

Most fluorophores, including fluorescent proteins, absorb and emit light as dipoles. This creates the opportunity to reveal not only the position, but also the orientation of fluorophores and of the molecular assemblies to which they are bound. Polarized light microscopes that are equipped to excite and/or detect polarized fluorescence already exploit this opportunity. The orientation and kinetics of molecular assemblies determine directionality of cellular function or disease. For example, directional cell migration during wound healing or metastasis relies on the flow of a patterned actin network which generates net force towards the direction of migration.

The molecular orientation is revealed by using either polarized light for dipole excitation or polarization analysis of the dipole emission, or both. However, current microscopes illuminate and image the sample from a single viewing direction. Accordingly, the polarization of the excitation light and the emitted fluorescence is primarily defined in the plane perpendicular to the illumination/viewing direction as illustrated in FIGS. 2A and 2B. Dipoles parallel to the illumination/viewing direction can neither be excited nor detected efficiently, thus making it difficult or even impossible to determine the complete orientation distribution of fluorophores bound to three-dimensional structures.

It is with these observations in mind, among others, that various aspects of the present disclosure were conceived and developed.

BRIEF DESCRIPTION OF THE DRAWINGS

FIG. 5A is an image showing maximum intensity projection images corresponding to imaging volumes obtained with different polarizations of illumination light and FIG. 5B shows the resulting reconstruction, according to one aspect of the present disclosure.

Corresponding reference characters indicate corresponding elements among the view of the drawings. The headings used in the figures do not limit the scope of the claims.

DETAILED DESCRIPTION

Figure 1:
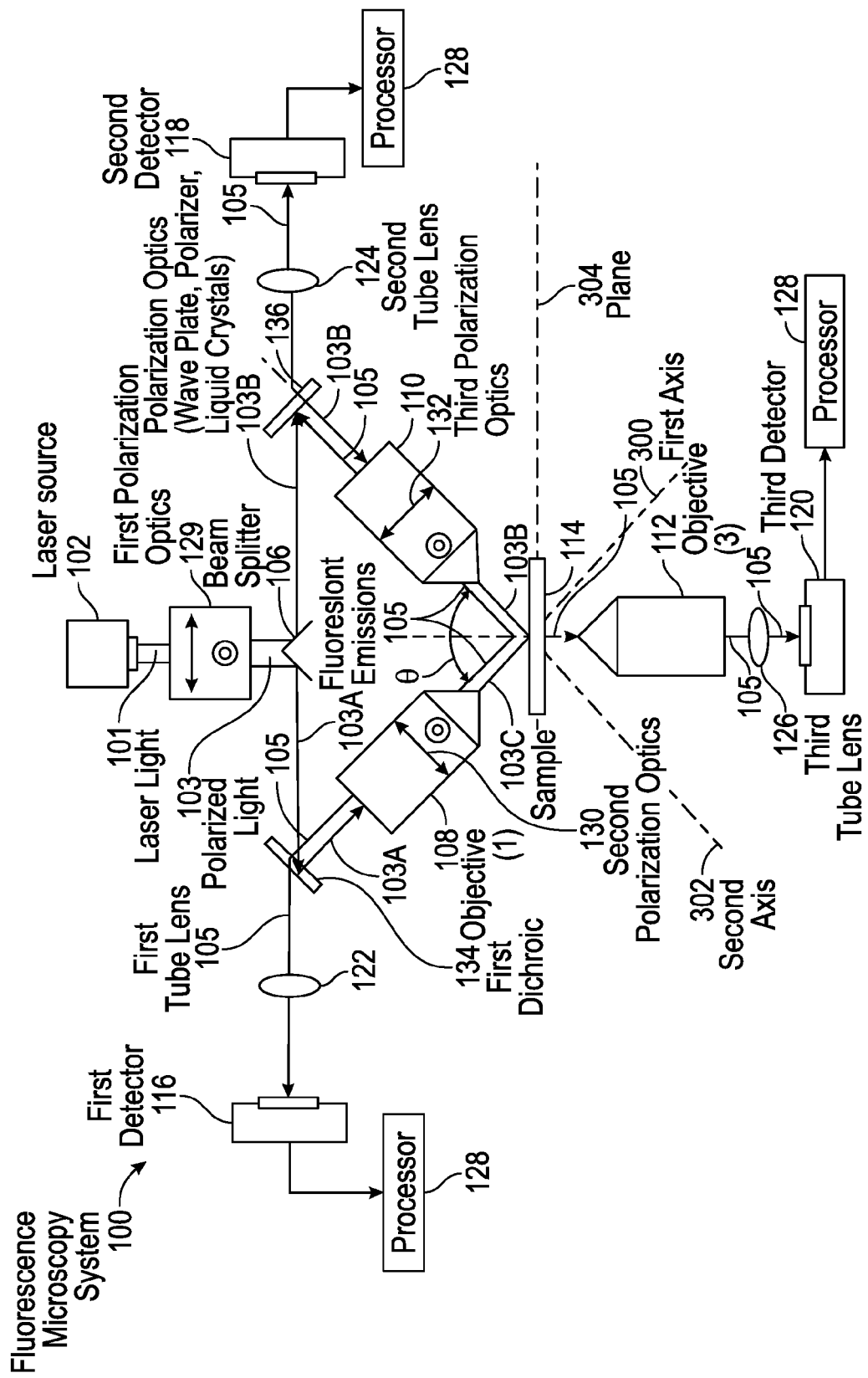
FIG. 1 is a simplified illustration showing one embodiment of a fluorescence microscopy system, according to one aspect of the present disclosure.

As described herein, systems and methods for extending fluorescence polarization imaging so that the dipole moment of a fluorescent dye emitted by a sample may be excited regardless of the three-dimensional orientation of the dipole. In one aspect, the dipole is excited from multiple directions, thereby ensuring that the excitation of the sample occurs along multiple orientations even if the dipole is unfavorably oriented along the axial (propagation) axis of the detection objective. In one embodiment, a dual-view inverted selective-plane illumination microscope (diSPIM) is used to illuminate the sample and detect the resulting polarized fluorescence emissions emitted by the sample from two different directions that are non-parallel relation relative to each other. In one embodiment, polarization-resolved excitation of the sample and epi-detection of the emitted polarized fluorescence captures the three-dimensional orientation of the excitation dipole along the focal plane of the same excitation/detection objective used to excite the sample and detect the emitted fluorescence. In one embodiment, polarization-resolved excitation of the sample in alternating sequence of excitation and non-parallel detection of the fluorescence emitted by the sample captures substantially most of the projection of the three-dimensional orientation of the excitation dipole in the axial or meridional plane of the respective detection objective. In one embodiment, the system includes a processor in operative communication with one or more detectors for capturing data related to the position and three-dimensional orientation of each excitation dipole detected in the polarized fluorescence emissions emitted by the sample detected by one or more objective lenses. The processor is operable for computing the three-dimensional orientation and position of the excitation dipole in each voxel detected in the fluorescence emission emitted by the sample being illuminated. In some embodiments, the system captures a plurality of images with different excitation polarization such that the processor may determine the position and three-dimensional orientation of each excitation dipole detected by one or more detectors. Referring to the drawings, embodiments of a system for determining the three-dimensional dipole orientation and position of each voxel of an illuminated sample are illustrated and generally indicated as 100 in FIGS. 1-4.

Referring to FIG. 1, one embodiment of a fluorescence microscopy system, designated 100, is illustrated. In one aspect, the fluorescence microscopy system 100 is operable to determine the position and orientation of excitation dipoles in fluorescence emissions emitted from a sample 114 being illuminated In some embodiments, the fluorescence microscopy system 100 includes a light source 102 for emitting a light beam 101 that is polarized by a first polarization optics 129 for polarizing the light beam 101 into polarized light 103. In some embodiments, the first polarization optics 129 may include a wave plate, a polarizer, and/or one or more liquid crystals to polarize the light beam 101. In some embodiments, the light source 102 may be a laser for emitting a laser light beam; however, in other embodiments, the light source 102 may be other sources of light, such as lamps that emit a light beam capable of being polarized.

In some embodiments, the polarized light 103 may be split by a beam splitter 106 into split polarized light 103A and 103B. In some embodiments, the split polarized light 103A is redirected by a first dichroic mirror 134 through a first objective lens 108 which may include a second polarization optics 130 for further polarizing the split polarized light 103A into split polarized light 103C for illumination of sample 114 along a first axis 300. As shown, the split polarized light 103B is redirected by a dichroic mirror 136 through a second objective lens 110 which may include a third polarization optics 132 for further polarizing the split polarized light 103B into split polarized light 103D for illumination of sample 114 along a second axis 302 that is in orthogonal relation relative to the first axis 300.

As the sample 114 is illuminated, those polarized fluorescence emissions 105 emitted by the sample 114 substantially along a plane orthogonal to the first axis 300 are detected by the first objective lens 108, while those polarized fluorescence emissions 105 emitted by the sample along a plane substantially parallel to the first axis 300 are not detected by the first object lens 108. In addition, those polarized fluorescence emissions 105 emitted by the sample 114 substantially along a plane orthogonal to the second axis 302 are detected by the second objective lens 110, while those polarized fluorescence emissions 105 emitted by the sample 114 along a plane substantially parallel to the second axis 302 are not detected by the second objective lens 110. In this arrangement, the orthogonal relationship between the first objective 108 and the second objective 110 allows the fluorescence microscopy system 100 to detect the excitation dipoles regardless of their axis of orientation. In other embodiments, the first and second objectives 108 and 110 may be oriented at a non-parallel angle relative to each other.

In one arrangement, the polarized fluorescence emissions 105 detected by the first objective lens 108 may be redirected by the first dichroic mirror 134 through a first tube lens 122 for detection by a first detector 116. In a further arrangement, the fluorescence emissions 105 detected by the second objective lens 110 may be redirected by the second dichroic mirror 136 through a second tube lens 124 for detection by a second detector 118.

In some embodiments, a third objective 112 may be positioned below a plane 304 of the sample 114 and oriented along a third axis 306 that forms a 135 degree angle relative to the first and second axes 300 and 302, respectively. The third objective lens 112 functions to detect fluorescence emissions 105 emitted below the plane 304 of the sample 114 and at an angle perpendicular to the plane 304 of the sample 114. In some embodiments, the fluorescence emissions 105 detected by the third objective 112 may be imaged through a third tube lens 126 for detection by a third detector 120. In some embodiments, the third objective 112 may be oriented in a non-parallel angle relative to the first and second axes 300 and 302, respectively.

In some embodiments, the first detector 116, second detector 118 and third detector 120 are in operative communication with one or more processors 128 that utilize one or more algorithms for computing the position and three-dimensional orientation of the excitation dipole based on the images of the fluorescence emissions 105 captured from the first detector 116, second detector 118 and third detector 120, respectively.

In some embodiments, the first and second objective lenses 108 and 110 may be, for example, a Nikon 0.8 NA, Nikon 0.8 NA, Nikon 1.1 NA, Special Optics 0.71 NA lenses, although other types or kinds of objective lenses are contemplated.

Figure 2A:
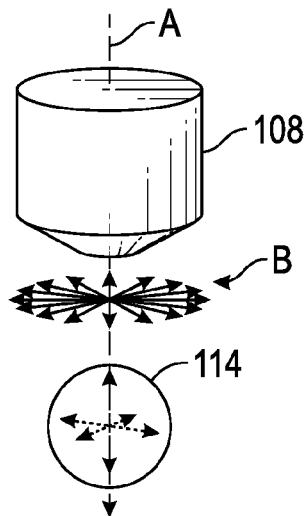
FIG. 2A shows a schematic of a conventional epi-fluorescence microscope and FIG. 2B shows a schematic of a conventional dual-view selective plane illumination microscopy system, according to one aspect of the present disclosure.
Figure 2B:
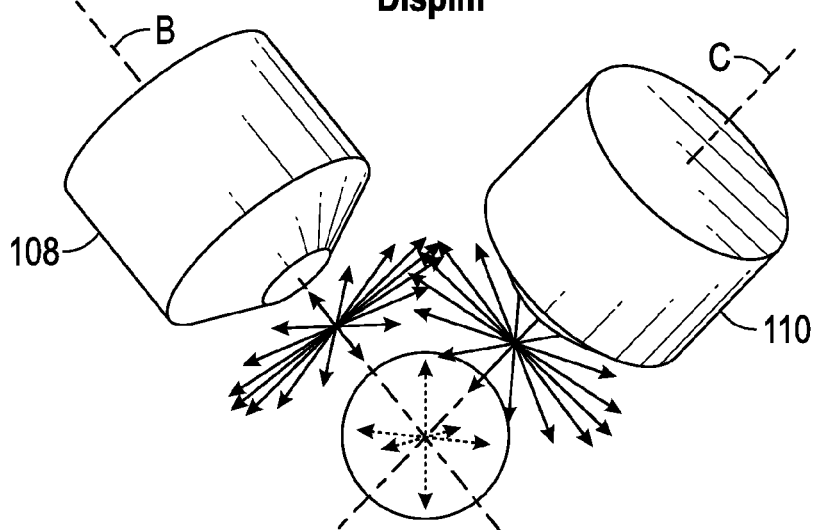

In some embodiments, the fluorescence microscopy system 100 may operate in either in an epi-detection mode of operation (FIG. 2A) or an orthogonal detection mode of operation (FIG. 2B). In the epi-detection mode of operation shown in FIG. 2A, a single objective lens, e.g., first objective 108 focuses the polarized light rays in a direction along an axis A to illuminate a sample 114 and then the same objective detects the resulting fluorescence emissions emitted by the sample. In this mode of detection, the polarized fluorescence emissions emitted by the sample along a plane perpendicular to the axis of the first objective 108 are detected by the first objective 108.

Figure 3A:
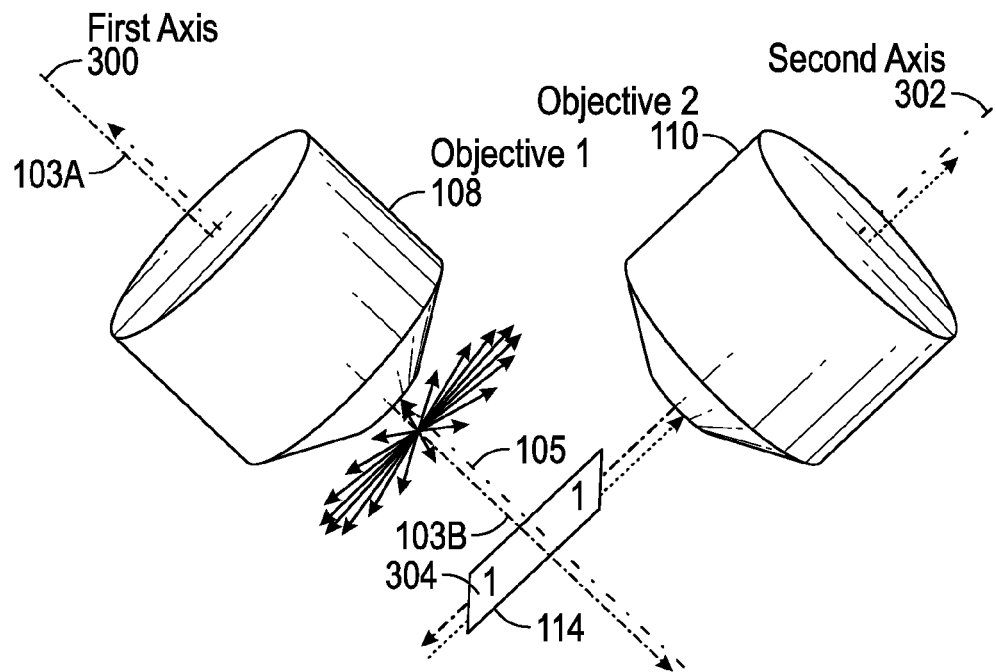
FIGS. 3A and 3B illustrate a measurement scheme for obtaining a three-dimensional dipole orientation using epi-detection of fluorescence intensity produced by polarization-resolved excitation, according to one aspect of the present disclosure.
Figure 3B:
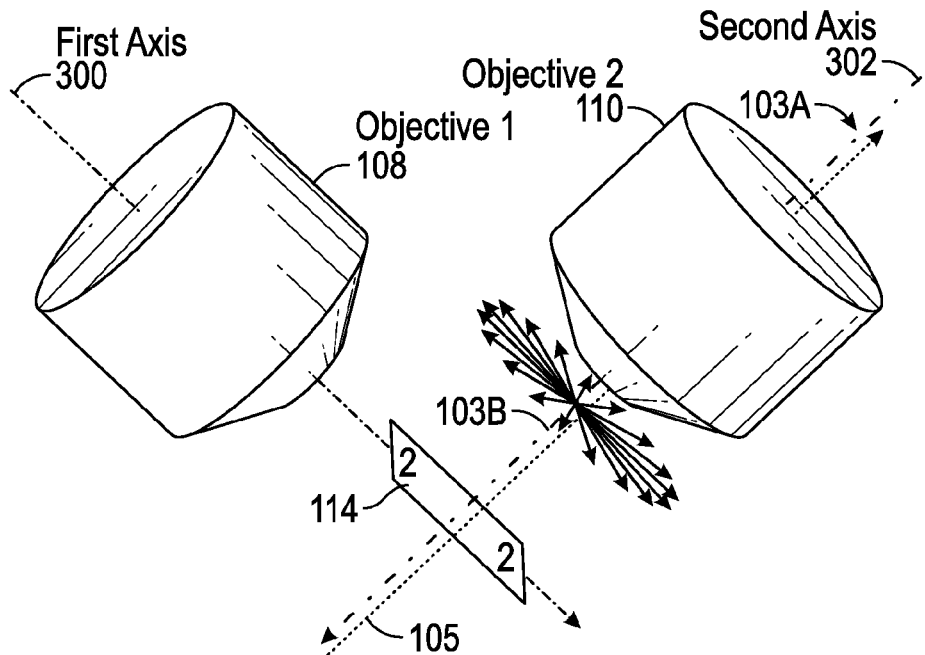

As shown in FIGS. 3A and 3B, in the epi-detection mode of operation the fluorescence microscopy system 100 the same objective lens, e.g., first objective 108, illuminates the sample 114 and then detects the polarized fluorescence emissions of those emission dipoles oriented along a plane 304 that is in non-parallel relation relative to the axis 300 of first objective 108. In this arrangement, the second objective 110 is inactive when the first objective 108 illuminates the sample 114 and detects the resulting polarized fluorescence emissions. In alternating fashion, once the first objective 108 completes the sequence of illumination and detection, the second objective 110 then illuminates the sample 114 and then detects the polarized florescence emissions of those excitation dipoles not oriented in parallel relation to the second objective 110. In other words, the first objective 108 detects the polarized fluorescence emissions of those excitation dipoles not detectable by the second objective 110 and vice-versa.

In the orthogonal detection mode of operation shown in FIG. 2B, a two-objective arrangement alternately illuminates and detects the resulting polarized fluorescence emissions along a plane perpendicular to the axis of the respective detection objective. Specifically, the first objective 108 illuminates the sample 114 and then a second objective 110 detects those excitation dipoles oriented along a plane that is in non-parallel relation relative to the axis of the second objective 110. In alternating fashion, the second objective 110 then illuminates the sample 114 and the first objective 108 detects those excitation dipoles oriented along a plane that is in non-parallel relation relative to the axis of the first objective 108. In this manner, the first and second objectives 108 and 110 are capable of detecting those excitation dipoles oriented along axes that are not directly parallel to the axis of the respective objective such that the first and second objectives 108 and 110 are collectively capable of detecting excitation dipoles aligned along any particular orientation.

Figure 4A:
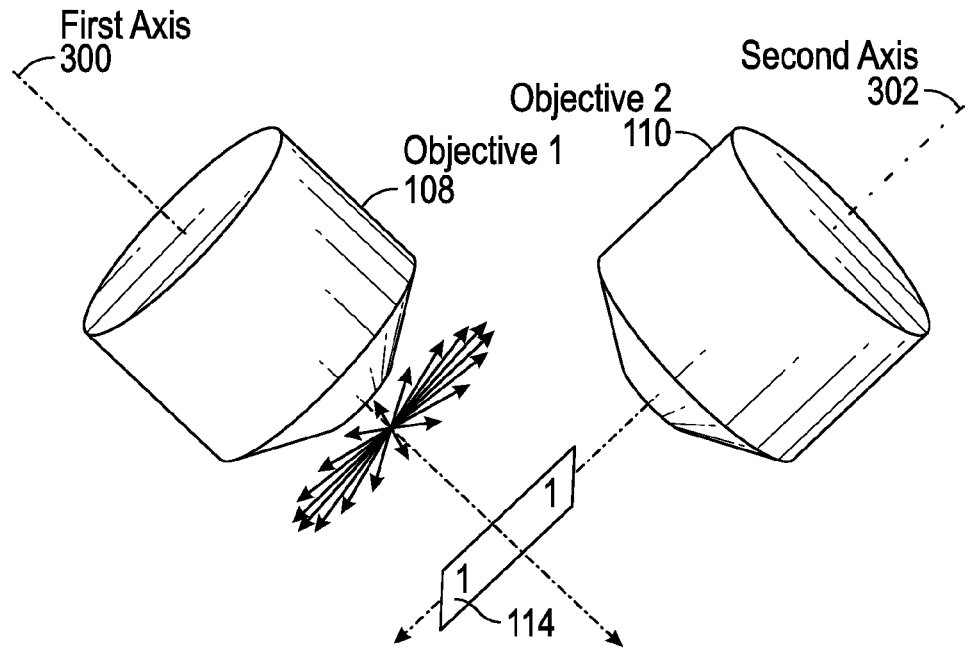
FIGS. 4A and 4B illustrate another measurement scheme for obtaining a three-dimensional dipole orientation using orthogonal detection of fluorescence intensity produced by polarization-resolved excitation, according to one aspect of the present disclosure.
Figure 4B:
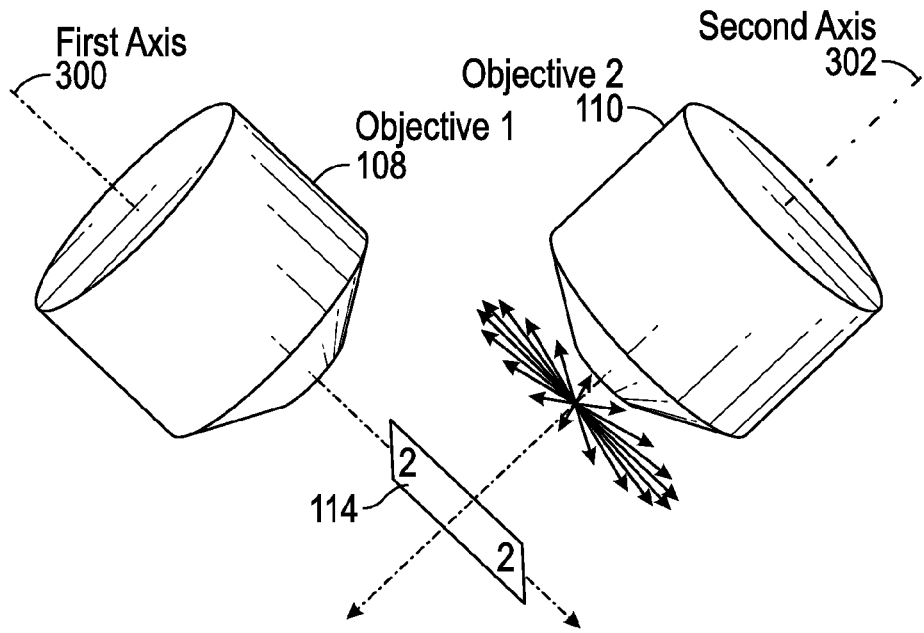

As shown in FIGS. 4A and 4B, in the orthogonal detection mode of operation the fluorescence microscopy system 100 utilizes the two-objective arrangement discussed above to alternately illuminate and detect the resulting fluorescence emissions of those excitation dipoles oriented along a plane that is in non-parallel relation relative to the axis of the respective detection objective. Referring to FIG. 4A, in a first sequence of operation the first objective 108 illuminates the sample 114 along the axis 300 of the first objective 108 which generates fluorescence emissions emitted from the sample 114. The second objective 110 then detects the fluorescence emissions from those excitation dipoles oriented along a plane that is in non-parallel relation relative to the axis 302 of the second objective 110. Referring to FIG. 4B, in a second sequence of operation the second objective 110 illuminates the sample 114 along the axis 302 of the second objective 110 which generates fluorescence emissions emitted from the sample 114. The first objective 108 then detects the fluorescence emissions from those excitation dipoles oriented along a plane that is in non-parallel relation relative to the axis 300 of the first objective 108. The alternating sequence of illumination and detection allow the fluorescence microscopy system 100 to detect the fluorescence emissions emitted by the excitation dipoles despite the orientation of each respective excitation dipole since the excitation dipoles are oriented along a plane that is in non-parallel relation relative to either the first objective 108 or the second objective 110.

In some embodiments, the processor 128 generates a position and orientation for each excitation dipole based on the images of the first fluorescence emission, second fluorescence emission and third fluorescence emission detected by the first objective 108, second objective 110 and third objective 112, respectively. As such, the processor 128 generates an orientation distribution of the detected excitation dipoles bound to one or more three-dimensional structures in at least a three-dimensional orientation.

In addition, the polarization state of the laser light beam 101 may be changed arbitrarily by the first polarization optics 129, second polarization optics 130 and/or third polarization optics 132. The detector 128 may collect images of the first, second and/or third fluorescence emissions 105 for each polarization state.

In some embodiments, a beam splitter 106 is not required and each of the first, second and third objective lenses 108, 110 and 112 may have a dedicated light source 101 that is not necessarily independent of the other two light sources 102.

Testing

A prototype microscopy system was constructed so that the method could be reduced to practice. The prototype microscopy system included a diSPIM with asymmetric objectives (1.1 NA, Nikon; 0.71 NA, Special Optics, corresponding to first and second objectives 110 and 108 shown in FIG. 1) equipped with polarization optics to produce polarized excitation through each objective. To demonstrate the method, actin filaments were imaged that were immunostained with Alexa Fluor 488 phalloidin. This label binds strongly to actin filaments, producing a strongly polarized fluorescence that depends on the relative orientation of the bound filament and polarized excitation. Eight volumetric stacks were obtained, first by exciting the sample with polarized illumination introduced by 108 of varying orientation (0°, 45°, 90°, and 135°, examples in FIG. 5, LEFT), collecting fluorescence through 110; and then by repeating this process with polarized illumination through 110 (also of orientation 0°, 45°, 90°, and 135°, collecting fluorescence through 108).

Next, a reconstruction was performed on a processor utilizing an algorithm that predicts average orientation in each voxel. The algorithm uses a model of the excitation and radiation processes to predict the relationship between the average dipole orientation and the intensities measured by the instrument. To recover the average dipole orientation from the measured intensities the object was expanded onto spherical harmonic functions and solved the linearized reconstruction problem in angular frequency space. As shown in FIG. 5A, example raw data (Alexa Fluor Phalloidin labeling actin in fixed U2OS cells) showing maximum intensity projection images corresponding to imaging volumes obtained with different polarizations of illumination light (introduced through 0.71 NA objective lens (first objective lens 108), and collected through a 1.1 NA objective lens (second objective lens 110). Orientation of the input illumination is indicated in the inset to each image. This data, plus an additional set of 4 volumes (excited with different orientations through the second objective lens 110, collected through the first objective lens 108, form the input data to the reconstruction algorithm. FIG. 5B shows the result of reconstruction. Example projection from data, showing orientations (brown glyphs) inside each voxel. In one aspect, the reconstruction allows us to derive orientation from multi-view fluorescence images captured with different orientations of the illumination.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A fluorescence microscopy system comprising:
a light source for emitting a light beam;
a first polarization optics for converting the light beam into a polarized light beam;
a beam splitter for splitting the polarized light beam into a first polarized light beam and a second polarized light beam;
a first objective oriented along a first axis such that the first polarized light beam illuminates a sample along a first angle to produce a first fluorescence emission;
a second objective oriented along a second axis such that the second polarized light beam illuminates the sample at a second angle that is not parallel relative to the first angle to produce a second fluorescence emission, wherein the first objective is oriented to detect the second fluorescence emission and the second objective is oriented to detect the first fluorescence emission; and
a third objective lens oriented along a third axis at a non-parallel relation relative to the first axis of the first objective and the second axis of the second objective, wherein the third detector detects a third fluorescence emission from the sample.

2. The fluorescence microscopy system of claim 1, further comprising: a first detector in communication with the first objective for receiving images from the second fluorescence emission; and a second detector in communication with the second objective for receiving images from the first fluorescence emission.

3. The fluorescence microscopy system of claim 2, wherein the third objective is in communication with a third detector for receiving images from the third fluorescence emission.

4. The fluorescence microscopy system of claim 3, wherein the third detector is in communication with a processor for receiving images of the third fluorescence emission from the third objective.

5. The fluorescence microscopy system of claim 2, wherein the first detector and the second detector are in respective communication with a processor for receiving the images of the second fluorescence emission from the first objective and the first fluorescence emission from the second objective.

6. The fluorescence microscopy system of claim 5, wherein the processor generates an orientation distribution of excitation dipoles bound to one or more three-dimensional structures based on the first fluorescence emission and second fluorescence emission detected by the first objective and the second objective, respectively.

7. The fluorescence microscopy system of claim 1, further comprising: a second polarization optics in association with the first objective for further changing the polarization of the first polarized light beam prior to illuminating the sample; and second polarization optics in association with the second objective for further changing the polarization of the second polarized light beam prior to illuminating the sample.

8. The fluorescence microscopy system of claim 1, wherein the first polarization optics comprise a wave plate, a polarizer, and liquid crystals.

9. The fluorescence microscopy system of claim 1, further comprising: a first dichroic mirror in communication with the beam splitter for redirecting the first polarized light beam to the first objective; and a second dichroic mirror in communication with the beam splitter for redirecting the second polarized light beam to the second objective.

10. The fluorescence microscopy system of claim 1, wherein the first objective and the second objective illuminate the sample with the first polarized light beam and the second objective, respectively, in alternating sequence.

11. The fluorescence microscopy system of claim 1, wherein the first objective and the second objective detect the first and second fluorescence emissions, respectively, in alternating sequence.

12. The fluorescence microscopy system of claim 1, wherein the first fluorescence emission detected by the second objective is oriented along a first plane that is in non-parallel relation relative to the second axis of the second objective and wherein the second fluorescence emission detected by the first objective is oriented along a second plane that is in non-parallel relation relative to the first axis of the first objective.

13. A fluorescence microscopy system comprising:
a laser source for emitting a laser light beam;
a first polarization optics for converting the laser light beam into a polarized light beam;
a beam splitter for splitting the polarized light beam into a first polarized light beam and a second polarized light beam;
a first objective oriented along a first axis such that the first polarized light beam illuminates a sample along a first angle to produce a first fluorescence emission from a first plurality of excitation dipoles;
a second objective oriented along a second axis such that the second polarized light beam illuminates the sample at a second angle that is not parallel relative to the first angle to produce a second fluorescence emission from a second plurality of excitation dipoles, wherein the first objective is oriented to detect the first plurality of excitation dipoles oriented at an angle perpendicular to the first axis and the second objective is oriented to detect the second plurality of excitation dipoles oriented at an angle perpendicular to the second axis; and
a third objective lens oriented along a third axis at a non-parallel relation relative to the first axis of the first objective and the second axis of the second objective, wherein the third detector detects a third fluorescence emission from the sample.

14. The fluorescence microscopy system of claim 13, wherein the first objective is oriented not to detect the first plurality of excitation dipoles oriented at an angle parallel to the first axis and the second objective is orientated not to detect the second plurality of excitation dipoles oriented at an angle parallel to the second axis.

15. The fluorescence microscopy system of claim 13, wherein the first polarization optics comprise a wave plate, a polarizer, and liquid crystals.

16. A method for determining the position and orientation of excitation dipoles generated by fluorescence emissions from a sample comprising:
generating a laser light beam; converting the laser light beam into a polarized light beam;
splitting the polarized light beam into a first polarized light beam and a second polarized light beam;
illuminating the sample through the first objective oriented along a first angle to produce a first fluorescence emission;
illuminating the sample through a second objective oriented at a second angle that is not parallel relative to the first angle to produce a second fluorescence emission, detecting a first plurality of excitation dipoles in the second fluorescence emission through the second objective that is oriented along a plane in non-parallel relation to the first axis and detecting a second plurality of excitation dipoles in the first fluorescence emission through the first objective that is oriented along a second plane in non-parallel relation to the second axis; and
illuminating the sample through a third objective lens oriented along a third axis at a non-parallel relation relative to the first axis of the first objective and the second axis of the second objective, wherein the third detector detects a third fluorescence emission from the sample.

17. The method of claim 16, wherein a polarization state of the laser light beam is changed arbitrarily.

18. The method of claim 17, further comprising: collecting a series of images of the first and second fluorescence emissions through one or more detectors for each polarization state.

19. The method of claim 17, further comprising: processing the collected series of images of the first and second fluorescence emissions to determine the position and orientation of each of the first and second plurality of excitation dipoles.

20. The method of claim 17, wherein a reconstruction algorithm is applied when processing the collected series of imagers of the first and second fluorescence emissions.

* * * * *